UNITED STATES PATENT OFFICE.

JOSEPH ENDLER, OF ROCHESTER, PENNSYLVANIA.

PROCESS OF MAKING POTASH.

1,380,195.  Specification of Letters Patent.  Patented May 31, 1921.

No Drawing.  Application filed February 5, 1919.  Serial No. 275,244.

*To all whom it may concern:*

Be it known that I, JOSEPH ENDLER, a citizen of the United States, residing at Rochester, in the county of Beaver and State of Pennsylvania, have invented certain new and useful Improvements in Processes of Making Potash; and I do hereby declare the following to be a full, clear, and exact description of the invention, such as will enable others skilled in the art to which it appertains to make and use the same.

The primary object of this invention is to provide a process whereby potash may be made in large quantities from plants and weeds which have heretofore been considered useless, or practically so. I have found by experience that the ash obtained by burning the plants of sunflowers and ragweeds contain a high percentage of potassium carbonate so that by treating these ashes potash may be obtained and purified, this potash being then treated with calcium carbonate and coal by the well known process to produce commercial potassium carbonate.

In carrying my process into effect, I burn the plants, such as ragweeds, in a suitable furnace, the plants themselves constituting the fuel of the furnace. The resulting ash contains approximately thirty per cent. of potassium carbonate. To extract the potash, this ash is placed in suitable fabric bags which are then suspended in an iron vessel or container, the vessel being then closed and the ash subjected to the action of steam which is admitted to the container, the steam acting to dissolve and extract the potash by lixiviation. The resulting solution may be of any desired concentration and is placed in suitable iron pans and heated so as to evaporate the water, the product obtained being a relatively fine dust having a slight brownish tinge, the discoloration being due to the presence of organic matters obtained from the plants burned. It should also be noted that the ash obtained from burning the plants contains, as well as potassium carbonate, a certain amount of other matter both of which forms are lixiviated by the action of the steam so that the potassium carbonate will be obtained in solution, as stated.

The product obtained by evaporating this solution is then heated to a red heat so as to drive off the organic matters. This produces potassium compounds in a crystallized state, the product being white and semi-transparent. This product may now be treated in the well known manner to produce potassium carbonate in the commercial form, or the potash may be sold or used without being thus combined with the carbon and oxygen of the limestone and coal to form the carbonate.

By this process I am enabled to obtain great quantities of potash from weeds and plants which are readily available in great quantities in many sections of the country, and this potash may be produced at comparatively small cost.

What I claim is:

1. The process of making potash from potash-bearing plants consisting in reducing the plants to ashes and subjecting the ashes to the action of steam to provide moisture for admixture therewith to extract it by lixiviation.

2. The process of making potash from potash-bearing plants consisting in reducing the plants to ashes, subjecting the ashes in a porous receptacle to the action of steam to provide moisture for admixture therewith to facilitate its removal by lixiviation and through the pores of the receptacle, heating the solution to obtain a dry residue, and in heating said residue to drive off organic matters.

In testimony whereof I affix my signature in presence of two witnesses.

JOSEPH ENDLER.

Witnesses:
 GEORGE E. ENDLER,
 HERMAN VOLLMER.